Patented Dec. 4, 1951

2,576,914

UNITED STATES PATENT OFFICE 2,576,914

COATED PAPERS AND METHODS AND COMPOSITIONS FOR PREPARING SAME

Gerald R. Barrett, Winchester, Mass., assignor to Monsanto Chemical Company, St. Louis, Mo., a corporation of Delaware No Drawing. Application February 28, 1948, Serial No. 12,143

18 Claims. (Cl. 117—155)

The present invention relates to improved coated papers and more particularly to improved mineral-coated printing papers. It also relates to a coating composition for paper and an improved mineral and/or pigment-binding composition.

Mineral-coated printing papers as employed heretofore have not been generally satisfactory. This is particularly true in respect to printing papers known in the art as litho papers, offset papers, book papers and the like. One important criterion necessary in this type of paper is a coating which is resistant to rub-off when moist. Another important criterion is that the coating possess good ink receptivity and at the same time possess the property of allowing the ink to set in a relatively short time. Moreover, the coating should be adherent and not susceptible to partial removal during a super-calendering operation.

Mineral-coated printing papers have most commonly been prepared by employing starch or casein as a mineral or pigment binder. For example, a suitable fibrous base such as a high quality pulp or rag paper is coated with a suspension comprising a pigment or mineral such as clay, blanc fixe, calcium carbonate, talc or the like and starch or casein, and then calendered. This paper product leaves much to be desired. When starch is employed, the paper has poor water-resistance and poor resistance to wet-rub. In addition, much of the binding ability of the starch is lost on calendering which results in a paper having a surface which is smooth in appearance, but relatively rough for printing purposes, that is, it does not take ink uniformly. On the other hand, casein possesses the objectionable feature of having a variable composition with the result that the coating produced therefrom is not uniform either as to resistance to rub-off when moist or in regard to ink receptivity. Moreover, casein is subject to deterioration by heat and various types of organisms. In addition, casein also tends to lose much of its binding ability on calendering.

One object of the invention is to provide a coating composition for paper.

A further object of the invention is to provide a pigment or mineral-binding composition which forms an adherent paper coating while retaining its ability to bind pigments or minerals on calendering.

A further object of the invention is to provide an improved coated paper having good water-resistance and adapted to embossing without chipping or cracking of the coating.

A further object of the invention is to provide an improved mineral-coated printing paper which is characterized by a smooth, level and uniform finish, good ink receptivity and good resistance to rub-off when moist.

A further object of the invention is to provide an improved mineral-coated printing paper especially adapted for the reproduction of fine half-tone cuts.

Still further objects and advantages of the invention will appear from the following description and the appended claims.

The invention, in general, is practiced by applying to a suitable paper base stock by appropriate coating apparatus a dispersion and/or suspension, termed a coating color, comprising as essential ingredients a suitable pigment or mineral of the type hereinbefore described, a long chain unsaturated fatty acid or derivatives thereof, and a copolymer, preferably in the form of a water-soluble salt, of alkyl half esters of ethylene $\alpha,\beta$-dicarboxylic acids and/or anhydrides and a polymerizable vinyl compound or compounds having the structural formula of R—CH=CH$_2$, where R is a phenyl or substituted phenyl radical; drying the coated paper and then calendering the coated stock.

The dispersions or suspensions as employed in the practice of the invention are liquid in nature and preferably comprise water as the dispersing phase or liquid. Generally, the ingredients employed therein are used in a water-soluble or finely-dispersible form when possible. For example, the long chain unsaturated fatty acids are generally employed at least partially in the form of water-soluble salts, for example, as the ammonium or alkali metal salt, while the copolymeric ingredient is preferably employed in the form of a water-soluble or finely-dispersible ammonium or alkali metal salt. On the other hand, since the pigment or mineral is rarely water-soluble, it is generally necessary to disperse it in water or other suitable liquid to form a usable slip as, for example, with the aid of a dispersing agent such as sodium tetraphosphate, by use of a ball mill or a colloidal mill and the like.

In general, it is possible to employ in such dispersions or suspensions a variety of long chain unsaturated fatty acids and/or water-soluble salts thereof. Such acids have at least one double or triple bond and may contain substituent radicals such as hydroxyl, halogen and other radicals. In general, unsaturated fatty acids having at least 12, and preferably from 15 through 18, carbon atoms are particularly effective for use in such dispersions. Such fatty acids may be employed individually or as mixtures and when mixtures are used it is only necessary that they make up the greater or major portion thereof. Thus, it is preferable to use such acids as oleic acid, ricinoleic acid, palmitoleic acid, erucic acid, linoleic acid, linolenic acids, elaeostearic acid, 6-7 stearolic acid and the like or mixtures thereof, or such fatty acid mixtures as tall oil fatty acids, distilled linseed fatty acids, conjugated linseed fatty acids, distilled soya bean fatty acids, conjugated soya bean fatty acids, distilled rape seed fatty acids and the like, which mixtures comprise a major portion of unsaturated fatty acids of the type hereinbefore described.

The form in which such fatty acids are employed depends to a certain extent on the quantity used and the desired viscosity of the dispersions or suspensions as employed herein. Generally, it is preferable to employ such fatty acids at least partially in the form of a water-soluble salt such as an ammonium or alkali metal salt. However, they may be employed wholly in the form of a water-soluble salt or wholly as free fatty acid in emulsified form if desired. In general, a water-soluble salt of such fatty acid will give a higher viscosity dispersion as compared to the free fatty acid. As a general rule, the larger the quantity of fatty acid or water-soluble salt thereof employed, the lower the viscosity of the dispersion.

The copolymeric materials employed herein may be prepared in any suitable manner. In general, they are prepared by first reacting a suitable monohydric alcohol, preferably an aliphatic monohydric alcohol having from 3 to 8 carbon atoms as, for example, n-butyl alcohol, sec-butyl alcohol, isopropyl alcohol, methyl isobutyl carbinol, capryl alcohol and the like, with a suitable ethylene $\alpha,\beta$-dicarboxylic acid or anhydride such as maleic acid, fumaric acid, maleic anhydride and the like, until the reaction product, which is substantially an alkyl half ester or an alkyl acid ester, has a substantial constant acid value on continued heating, and then conjointly polymerizing such product with a polymerizable vinyl compound or compounds having the structural formula $R-CH=CH_2$, where $R$ is a phenyl or substituted phenyl radical, in the presence of a suitable catalyst as, for example, a peroxide catalyst such as benzoyl peroxide, until a hard resin, insoluble in water, but soluble in aqueous alkali or aqueous ammonia solutions, is obtained. Examples of such vinyl compounds are styrene, methyl styrenes, chloro styrene, dichloro styrene and the like.

In the above copolymerization reaction it is preferable to employ about 1 to 1.5 molecular proportions of such vinyl compound per molecular proportion of such anhydride or acid in the reaction mixture.

In carrying out the preparation of the alkyl half ester as described above, it is preferable to employ the monohydric alcohol and ethylene $\alpha,\beta$-dicarboxylic anhydride or acid in such molecular proportions as to have at least a small proportion of unesterified acid or anhydride in the reaction mixture after the reaction is completed. The proportion of such unesterified anhydride or acid present will vary depending upon the number of carbon atoms in the monohydric alcohol, the molecular weight of the copolymer prepared and the degree of water-solubility of the copolymer salt desired. It is generally desirable to prepare an alkyl half ester which comprises from about 1.00 to 0.4 mol of aliphatic monohydric alcohol per mol of such anhydride or acid. When lower aliphatic monohydric alcohols comprising, for example, about 3 or 4 carbon atoms are employed, the alkyl half esters prepared therefrom preferably comprise from about 1.0 to 0.5 mol of such alcohol per mol of such anhydride or acid. On the other hand, when higher aliphatic monohydric alcohols which contain 5 or more carbon atoms are employed, it is preferable to form an alkyl half ester which contains a lower proportion of such alcohol than 1.0 mol and preferably comprising 0.85 to 0.4 mol of such higher monohydric alcohol per mol of such anhydride or acid.

In general, the proportion of unesterified anhydride or acid present in the alkyl half ester may be wholly or partially replaced by esterifying such unesterified proportion with methanol. Such esterification may be carried out by incorporating a suitable amount of methanol with the monohydric alcohol prior to the preparation of the alkyl half ester with the result that a mixed half ester comprising a small proportion of methyl half ester is formed. When the alkyl half ester is prepared by the reaction of methanol, a lower aliphatic monohydric alcohol having from 3 to 4 carbon atoms and an ethylene $\alpha,\beta$-dicarboxylic acid or anhydride, it is preferable to employ from 0.95 to 0.5 molecular proportion of such alcohol and from 0.05 to 0.4 molecular proportion of methanol to about 1 molecular proportion of such anhydride or acid. On the other hand, if a higher aliphatic monohydric alcohol having 5 or more carbon atoms is used in the preparation of the alkyl half ester, it is preferable to employ from about 0.85 to 0.4 molecular proportion of such higher alcohol, and from about 0.1 to 0.4 molecular proportion of methanol to about 1 molecular proportion of such anhydride or acid.

The viscosity of the ammonia or alkali metal salts of the above described polymeric materials in water depends to a considerable extent, assuming that the average molecular weight of the copolymers are substantially the same, on the alkyl acid ester employed. Generally, the more carbon atoms contained in the alkyl group, the higher the viscosity of the copolymeric salt. For any given alkyl half ester which is employed, the viscosity of the copolymeric salt can be lowered, for example, by employing a minor proportion of methyl acid ester, such as methyl acid maleate, together with the alkyl half ester of alkyl acid ester in the copolymerization with the vinyl compound or compounds. Similar results may be obtained by omitting such methyl acid ester in whole or part and employing an alkyl acid ester which comprises a minor proportion of such unesterified anhydride or acid, for example, unesterified maleic anhydride or maleic acid.

The water-solubility of the above described copolymeric materials in aqueous alkali or aqueous ammonia solution also depends to a considerable extent, assuming that the average molecular weights of the copolymer are substantially the same, on the alkyl half ester used in the copolymerization reaction. The water-solubility of the alkali metal or ammonia salt generally decreases as the number of carbon atoms in the alkyl group increases. Water-solubility of the copolymeric salt is generally increased for any one alkyl half ester by copolymerizing the alkyl half ester and a minor proportion of methyl acid ester as, for example, methyl acid maleate together with vinyl compounds of the type described. For alkyl half esters comprising 5 or more carbon atoms in the alkyl group, the amount of methyl acid ester employed may approach approximately half of the molecular proportion of total alkyl half ester used, based on the anhydride or acid of the type described herein.

Similar results may be obtained by omitting the methyl acid ester in whole or part and using a similar proportion of unesterified anhydride or acid of the type described herein.

In a preferred embodiment of the invention such copolymeric materials or resins are prepared by first forming alkyl half esters of an ethylene $a,\beta$-dicarboxylic acid or anhydride, preferably maleic anhydride, by reacting about 0.05 to 0.4 molecular proportion of methanol, and about 0.95 to 0.5 molecular proportion of sec-butyl alcohol per mol of maleic anhydride until the acid value as determined by titration remains substantially constant on continued heating and then conjointly copolymerizing such product with about 1 to 1.5 molecular proportions of styrene per molecular proportion of maleic anhydride in such product in the presence of a small proportion of an organic peroxide catalyst until a hard, substantially colorless resin insoluble in water, but soluble in aqueous alkali or aqueous ammonia solutions, is obtained.

Coating colors or dispersions as employed herein are prepared, in general, by adding to a mineral or pigment slurry as, for example, a clay slip comprising from about 50 to 80% solids, from about 5 to 30% by weight, based on the mineral or pigment, of copolymeric material in the form of the ammonia or alkali metal salt, preferably in aqueous solution, and from about 10 to 100% by weight, based on the copolymeric salt, of long chain unsaturated fatty acid, derivatives thereof, or mixtures of the type described. Additional water is then added to give a coating color or dispersion comprising about 30 to 50% by weight solids. Other methods of preparing such coating colors or dispersions may be used.

The coating colors or dispersions as described herein may also comprise small proportions of such adjuvants as waxes, wetting agents, antifoam agents and the like, if desired.

Coating colors of the type described herein can be applied to a paper base stock in a variety of ways and by various types of coating equipment. For example, it is possible to employ air knife coaters, roll coaters and the like. The coating application is then followed by a suitable drying operation as, for example, by air drying or by passing the coated stock through an air drier or over drying cans. Either one or both surfaces of the paper may be coated if desired.

In the preparation of high grade printing papers it is generally desirable to pass such mineral-coated papers through a super-calender in order to improve the levelness, smoothness and gloss of the coating. The mineral-coated papers as prepared herein possess a considerable advantage in this respect in contrast to mineral-coated papers having starch or casein as a pigment binder. Whereas from 10 to 12 passes through a super-calender are normally required for such coated papers, it is only necessary to pass the coated papers prepared in accordance with the invention 5 or 6 times through the super-calender to obtain a paper of equal gloss and levelness. This results not only in a considerable saving in labor and machine equipment, but also yields a paper which has more springiness and resilience than the starch or casein coated papers of the prior art.

A further understanding of the practice and advantages of the invention will be obtained from the following specific examples which are intended to be illustrative, but not limitative of the scope of the invention, parts and percentages being by weight unless otherwise specified.

EXAMPLE I

1. *Preparation of copolymeric material*

Sixty-two parts of maleic anhydride, 33 parts of secondary butyl alcohol and 5 parts of methanol are heated at a temperature of substantially 60–70° C. until a titration test with alkali shows a substantially constant acid value on continued heating. To 51.7 parts of this mixture are added 48 parts of styrene and 0.3 part of benzoyl peroxide as catalyst. This mixture is polymerized at a temperature of 60–70° C. during the period of rapid heat evolution and the temperature is then raised to about 125° C. to complete the reaction. The product is a hard, colorless resin insoluble in water, but soluble in aqueous ammonia or aqueous alkali solution.

2. *Preparation of pigment dispersion or coating color*

To a clay slip at 70% solids is added an ammonium salt of the above copolymeric material as an 11% resin solution together with an unsaturated fatty acid and sufficient water, to give the following coating colors or dispersions:

| Coating Color Number | Per Cent Polymeric Material Based on Clay | Per Cent Unsaturated Fatty Acid Based on Polymeric Material | Viscosity in Centipoises, 25° C. | Per Cent Total Solids |
|---|---|---|---|---|
| 1 | 12 | 10 (ammonium oleate) | 430 | 45 |
| 2 | 12 | 20 (ammonium oleate) | 283 | 45 |
| 3 | 12 | 30 (ammonium oleate) | 220 | 45 |
| 4 | 12 | 10 (emulsion, 20% ammonium oleate, 80% oleic acid) | 83 | 41 |
| 5 | 12 | 30 (emulsion, 20% ammonium oleate, 80% oleic acid) | 60 | 41 |
| 6 | 12 | 40 (emulsion, 20% ammonium oleate, 80% oleic acid) | 48 | 41 |
| 7 | 12 | 30 (emulsion, 80% tall oil fatty acids distilled, 20% ammonium salt of same) | 288 | 43 |
| 8 | 12 | 30 (emulsion, 80% ricinoleic acid, 20% ammonium ricinoleate) | 150 | 45 |
| 9 | 12 | 30 (80% linoleic acid, 20% ammonium linoleate) | 143 | 45 |
| 10 | 12 | 30 (80% distilled linseed fatty acid, 20% ammonium salt thereof) | 143 | 45 |
| 11 | 12 | 30 (90% conjugated linseed fatty acid, 10% sodium salt thereof) | 130 | 45 |
| 12 | 12 | 30 (90% distilled soya bean fatty acid, 10% sodium salt thereof) | 108 | 45 |
| 13 | 12 | 30 (90% conjugated soya bean fatty acids, 10% sodium salt thereof) | 103 | 45 |

3. Coating of paper

The above coating colors are applied individually to separate, but similar paper base stocks by a roll coater, after which the coated stocks are dried and super-calendered using about 6 passes or nips. Each coated paper was tested for pick by method of the "Technical Association of Pulp and Paper Industry," Standard T-459m-45 and found to be very satisfactory for printing purposes.

The coated papers were also tested for wet-rub and found to have good wet-rub characteristics. Of the above coating colors employed, those designated as Numbers 11 and 13 gave slightly superior wet-rub characteristics. The wet-rub test consists in moistening a finger and rubbing same over the coated surface. If the surface becomes slimy, or washes off, the test indicates that the coating is unsatisfactory. On the other hand, if the surface remains intact, a satisfactory product is indicated. Such test is commonly employed in the paper art for the evaluation of mineral-coated papers and their usefulness in wet offset lithography.

EXAMPLE II

1. Preparation of copolymeric material

Forty parts of methyl isobutyl carbinol, 51.7 parts of maleic anhydride and 2.9 parts of methanol were placed in a suitable reactor and heated for about 2 hours at a temperature of approximately 80 to 90° C.

To 57.25 parts of the above product were added 42.5 parts of styrene and 0.25 part of benzoyl peroxide and polymerization effected at a temperature of 60–70° C. during the period of rapid heat evolution by the polymerizing mass, and the temperature then raised to 125° C. to complete the reaction. The product is soluble in aqueous ammonia and aqueous alkali solutions.

2. Preparation of pigment dispersions or coating colors

Coating colors are prepared in similar manner and having the same ingredients as those prepared in Example I with the exception that in place of the copolymeric material of Example I is substituted the above copolymeric material in the form of a 10% resin solution in which said material is present in the form of its ammonium salt. Such coating colors have essentially the same total solids content and viscosity characteristics as those shown under paragraph 2, Example I.

3. Coating of paper

The above coating colors are applied individually to separate, but similar base stocks by an air knife coater, dried and the uncoated surface of each is then coated in the same manner and dried. The coated stocks are then super-calendered by passing same through a super-calender about 5 or 6 times. Such coated stocks are then tested for pick as described in Example I and are very satisfactory for wet offset lithography printing. Moreover, they exhibit excellent wet-rub resistance.

Pigment dispersions or coating colors of the type hereinbefore described are generally applied to a paper base stock as a substantially continuous film or coating, the continuity of which is substantially unchanged by the subsequent drying and calendering operations. However, the invention also contemplates the preparation of special effect coated papers, that is, papers having a discontinuous coating which is susceptible to varied effects resulting from printing partially on a coated and partially on an uncoated paper surface.

When applying a continuous coating to a paper stock, it is preferable to apply the coating color so as to deposit from 7 to 16 pounds of coating solids per surface per ream of paper (a book ream is 500 sheets of 25" x 38"). This relation is based on the assumption that the average ream of paper base stock which is suitable for the preparation of coated printing papers has a weight of approximately 40 to 45 pounds.

One of the important advantages of the invention resides in the fact that lower grades of paper, which have not been usable heretofore as bases for the preparation of coated papers suitable for printing, may be used in the practice of the invention. Such coated papers will compare favorably with those prepared from high grade paper base stocks which have been fabricated from long fiber hardwood pulps or rag pulps.

The copolymeric materials described herein and particularly the water-soluble ammonium or alkali salts of such copolymeric materials may be employed together with long chain unsaturated fatty acids of the type hereinbefore described in an aqueous solution or dispersion with or without a pigment for the preparation of ornamental or decorative coated papers. If no pigment is employed, the water-soluble salt of the copolymeric material together with the long chain unsaturated fatty acid forms a film or coating which is characterized by excellent water-resistance as compared to pigment-free casein coatings of the same thickness. On the other hand, small amounts of pigments, dyes or lakes may be incorporated in such solutions or dispersions which may then be coated on paper so as to yield an ornamental or decorative coated paper having unique characteristics and excellent water-resistant properties. Such coatings have a marked advantage over similar types of casein coatings when a water-soluble dye is incorporated therein since there is substantially no bleeding of the dye from such coatings while casein coatings containing water-soluble dyes tend to bleed the dye to a substantial degree. Moreover, such coatings can be embossed readily without substantial chipping or cracking as compared to casein coatings.

Such coatings or dispersions are preferably prepared by employing a water-soluble salt of the copolymeric material in the form of a 10 to 12% aqueous solution by weight and adding thereto from about 10 to 100% based on the copolymeric salt of long chain unsaturated fatty acid of the type hereinbefore described, either in the form of a free acid, or as the ammonium or alkali metal salt thereof or, preferably, partially as the ammonium or alkali metal salt and partially as the free acid. If a pigment is employed, the above dispersion may be added to the pigment as previously described or if small amounts of pigment are employed, they may be added to such dispersion. Water-soluble dyes, lakes or other coloring materials may be incorporated in such dispersions in a similar manner.

Generally, in the preparation of ornamental and decorative coated papers it is not necessary to apply as heavy a coating as is normally required for printing papers. Ornamental and decorative coated papers are usually coated on one surface only and it is generally desirable to apply from about 2 to 5 pounds of solids per ream per surface of paper based on a ream weight of about 36 pounds.

This application is a continuation-in-part of my application Serial No. 719,136, filed December 28, 1946, now abandoned.

What is claimed is:

1. A composition according to claim 8 wherein at least a portion of said substance is in the form of ammonium oleate.

2. A composition according to claim 8 wherein at least a portion of said substance is in the form of ammonium ricinoleate.

3. A composition according to claim 8 wherein at least a portion of said substance is in the form of ammonium linoleate.

4. A composition according to claim 9 wherein at least a portion of said substance is in the form of ammonium oleate.

5. A composition according to claim 9 wherein at least a portion of said substance is in the form of ammonium ricinoleate.

6. A composition according to claim 9 wherein at least a portion of said substance is in the form of ammonium linoleate.

7. A coating composition for paper comprising (1) a pigment; (2) a water-soluble salt of a copolymer of 1 to 1.5 molecular proportions of styrene with the reaction product of 1.0 to 0.4 molecular proportion of an aliphatic monohydric alcohol and 1 molecular proportion of maleic anhydride; (3) from 10 to 100% by weight, based on said salt, of a substance selected from the group consisting of unsaturated fatty acid having at least 12 carbon atoms, water-soluble salts of such fatty acids and mixtures thereof; and (4) water.

8. A coating composition for paper comprising (1) a pigment; (2) a water-soluble ammonium salt of a copolymer of 1 to 1.5 molecular proportions of styrene with the reaction product of 0.95 to 0.5 molecular proportion of sec-butyl alcohol, 0.05 to 0.4 molecular proportion of methanol and about 1 molecular proportion of maleic anhydride; (3) from 10 to 100% by weight, based on said salt, of a substance selected from the group consisting of unsaturated fatty acids having from 15 to 18 carbon atoms, water-soluble salts of such fatty acids and mixtures thereof; and (4) water.

9. A coating composition for paper comprising (1) a pigment; (2) a water-soluble ammonium salt of a copolymer of 1 to 1.5 molecular proportions of styrene with the reaction product of 0.1 to 0.4 molecular proportion of methanol; from about 0.85 to 0.4 molecular proportion of methyl isobutyl carbinol and about 1 molecular proportion of maleic anhydride; (3) from 10 to 100% by weight, based on said salt, of a substance selected from the group consisting of unsaturated fatty acids having from 15 to 18 carbon atoms, water-soluble salts of such fatty acids and mixtures thereof; and (4) water.

10. A mineral-coated paper having at least one surface thereof coated with a film comprising (1) a pigment; (2) from 5 to 30% by weight, based on said pigment, of a copolymer of 1 to 1.5 molecular proportions of styrene with the reaction product of 1.0 to 0.4 molecular proportion of an aliphatic monohydric alcohol and 1 molecular proportion of maleic anhydride; and (3) from 10 to 100% by weight, based on said copolymer, of a substance consisting of unsaturated fatty acids having at least 12 carbon atoms, water-soluble salts of such fatty acids and mixtures thereof.

11. A mineral-coated paper having at least one surface thereof coated with a film comprising (1) a pigment; (2) from 5 to 30% by weight, based on said pigment, of a copolymer of 1 to 1.5 molecular proportions of styrene with the reaction product of 0.95 to 0.5 molecular proportion of sec-butyl alcohol, from about 0.05 to 0.4 molecular proportion of methanol and about 1 molecular proportion of maleic anhydride; and (3) from 10 to 100% by weight, based on said copolymer, of a substance selected from the group consisting of unsaturated fatty acids having from 15 to 18 carbon atoms, water-soluble salts of such fatty acids and mixtures thereof.

12. A mineral-coated paper having at least one surface thereof coated with a film comprising (1) a pigment; (2) from 5 to 30% by weight, based on said pigment, of a copolymer of 1 to 1.5 molecular proportions of styrene with the reaction product of 0.85 to 0.4 molecular proportion of methanol and about 1 molecular proportion of maleic anhydride; and (3) from 10 to 100% by weight, based on said copolymer, of a substance selected from the group consisting of unsaturated fatty acids having from 15 to 18 carbon atoms, water-soluble salts of such fatty acids and mixtures thereof.

13. A coating composition for paper comprising (1) a water-soluble salt of a copolymer of 1 to 1.5 molecular proportions of a polymerizable vinyl compound having the structural formula R—CH=CH$_2$, where R is selected from the group consisting of phenyl radical and a substituted phenyl radical, with the reaction product of 1.0 to 0.4 molecular proportion of an aliphatic monohydric alcohol and about 1 molecular proportion of a dicarboxylic compound selected from the group consisting of ethylene $a,\beta$ dicarboxylic acids and anhydrides of such acids; (2) from 10 to 100% by weight, based on said salt, of a substance selected from the group consisting of unsaturated fatty acids having at least 12 carbon atoms, water-soluble salts of such fatty acids and mixtures thereof; and (3) water.

14. A coating composition for paper comprising (1) a material selected from the group consisting of dyes, lakes and pigments; (2) a water-soluble salt of a copolymer of 1 to 1.5 molecular proportions of styrene with the reaction product of 1.0 to 0.4 molecular proportion of an aliphatic monohydric alcohol comprising a major portion of an aliphatic monohydric alcohol having from 3 to 8 carbon atoms, and about 1 molecular proportion of a dicarboxylic compound selected from the group consisting of ethylene $a,\beta$ dicarboxylic acids and anhydrides of such acids; (3) from 10 to 100% by weight, based on said salt, of a substance selected from the group consisting of unsaturated fatty acids having at least 12 carbon atoms, water-soluble salts of such fatty acids and mixtures thereof; and (4) water.

15. A paper having at least one surface thereof coated with a film comprising (1) a copolymer of 1 to 1.5 molecular proportions of a polymerizable vinyl compound having the structural formula R—CH=CH$_2$, where R is selected from the group consisting of phenyl radical and a substituted phenyl radical, with the reaction product of 1.0 to 0.4 molecular proportion of an aliphatic monohydric alcohol and about 1 molecular proportion of a dicarboxylic compound selected from the group consisting of ethylene $\alpha,\beta$ dicarboxylic acids and anhydrides of such acids; and (2) from 10 to 100% by weight, based on said copolymer, of a substance selected from the group consisting of unsaturated fatty acids having at least 12 carbon atoms, water-soluble salts of such fatty acids and mixtures thereof.

16. A method of preparing mineral-coated printing papers which comprises applying to at least one surface of a paper base stock at least one coat of an aqueous pigment dispersion comprising (1) a pigment; (2) from 5 to 30% by weight, based on the pigment, of a water-soluble salt of a copolymer of 1 to 1.5 molecular proportions of a polymerizable vinyl compound having the structural formula $R-CH=CH_2$, where R is selected from the group consisting of phenyl radical and a substituted phenyl radical, with the reaction product of 1.0 to 0.4 molecular proportion of an aliphatic monohydric alcohol and about 1 molecular proportion of a dicarboxylic compound selected from the group consisting of ethylene $\alpha,\beta$ dicarboxylic acids and anhydrides of such acids; (3) from 10 to 100% by weight, based on said salt of a substance selected from the group consisting of unsaturated fatty acids having at least 12 carbon atoms, water-soluble salts of such acids and mixtures thereof; and (4) water; and then drying and calendering said stock.

17. A method of preparing mineral-coated printing papers which comprises applying to at least one surface of a paper base stock at least one coat of an aqueous pigment dispersion comprising from about 30 to 50% by weight solids prepared by adding to an aqueous pigment slip comprising from about 50 to 80% by weight of pigment (1) from about 5 to 30% by weight, based on said pigment, of a water-soluble ammonium salt of a copolymer of 1 to 1.5 molecular proportions of styrene with the reaction product of from about 0.05 to 0.4 molecular proportion of methanol, from about 0.95 to 0.5 molecular proportion of sec-butyl alcohol and about 1 molecular proportion of maleic anhydride; (2) from about 10 to 100% by weight, based on said salt, of a substance selected from the group consisting of unsaturated fatty acids having from 15 to 18 carbon atoms, water-soluble salts of such fatty acids and mixtures thereof; and (3) sufficient water to give said solids content; and then drying and calendering said stock.

18. A method of preparing mineral coated printing papers which comprises applying to at least one surface of a paper base stock at least one coat of an aqueous pigment dispersion comprising from about 30 to 50% by weight solids prepared by adding to an aqueous pigment slip comprising from about 50 to 80% by weight of pigment (1) from about 5 to 30% by weight, based on said pigment, of a water-soluble ammonium salt of a copolymer of 1 to 1.5 molecular proportions of styrene with the reaction product of 0.1 to 0.4 molecular proportion of methanol, from about 0.85 to 0.4 molecular proportion of methyl isobutyl carbinol and about 1 molecular proportion of maleic anhydride; (2) from about 10 to 100% by weight, based on said salt, of a substance selected from the group consisting of unsaturated fatty acids having from 15 to 18 carbon atoms, water-soluble salts of such fatty acids and mixtures thereof; and (3) sufficient water to give said solids content; and then drying and calendering said stock.

GERALD R. BARRETT.

REFERENCES CITED

The following references are of record in the file of this patent:

UNITED STATES PATENTS

| Number | Name | Date |
| --- | --- | --- |
| 2,187,817 | Hopff et al. | Jan. 23, 1940 |

FOREIGN PATENTS

| Number | Country | Date |
| --- | --- | --- |
| 588,725 | Great Britain | June 2, 1947 |